United States Patent
Xuan et al.

(10) Patent No.: US 9,244,303 B2
(45) Date of Patent: Jan. 26, 2016

(54) WIDE-VIEWING-ANGLE LIQUID CRYSTAL DISPLAY PANEL, COLOR FILM BASE PLATE AND MANUFACTURING METHOD THEREOF AS WELL AS DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventors: Minghua Xuan, Beijing (CN); Young Yik Ko, Beijing (CN); Xiangdan Dong, Beijing (CN); Shan Gao, Beijing (CN)

(73) Assignees: BOE Technology Group Co., Ltd., Beijing (CN); Chengdu BOE Optoelectronics Technology Co., Ltd., Chengdu (CN)

( * ) Notice: Subject to any disclaimer, the term of this patent is extended or adjusted under 35 U.S.C. 154(b) by 63 days.

(21) Appl. No.: 14/126,946

(22) PCT Filed: Nov. 19, 2012

(86) PCT No.: PCT/CN2012/084851
§ 371 (c)(1),
(2) Date: Dec. 17, 2013

(87) PCT Pub. No.: WO2013/107210
PCT Pub. Date: Jul. 25, 2013

(65) Prior Publication Data
US 2014/0118668 A1 May 1, 2014

(30) Foreign Application Priority Data
Jan. 21, 2012 (CN) .......................... 2012 1 0020074

(51) Int. Cl.
*G02F 1/1335* (2006.01)
*G02F 1/1343* (2006.01)

(52) U.S. Cl.
CPC .... *G02F 1/133514* (2013.01); *G02F 1/134309* (2013.01); *G02F 1/133516* (2013.01); *G02F 2001/134372* (2013.01)

(58) Field of Classification Search
CPC .......... G02F 1/133514; G02F 1/33516; G02F 2001/134372; G02F 1/134309
USPC ............ 349/106, 107, 109, 141, 187; 345/88; 445/24
See application file for complete search history.

(56) References Cited

U.S. PATENT DOCUMENTS

2006/0257761 A1    11/2006  Hasei et al.
2008/0143897 A1    6/2008   Chang
(Continued)

FOREIGN PATENT DOCUMENTS

CN    1866059 A     11/2006
CN    101206359 A   6/2008
(Continued)

OTHER PUBLICATIONS

International Preliminary Report on Patentability for International Application No. PCT/CN2012/084851 issued Jul. 22, 2014, 8pgs.
(Continued)

*Primary Examiner* — Dung Nguyen
*Assistant Examiner* — Tai Duong
(74) *Attorney, Agent, or Firm* — Banner & Witcoff, Ltd.

(57) ABSTRACT

A wide-viewing-angle liquid crystal display panel, a color film base plate (20) and a manufacturing method thereof as well as a display device. The wide-viewing-angle liquid crystal display panel comprises an array base plate (10) and a color film base plate (20). The array base plate (10) comprises a planar electrode (11) and a slit-shaped electrode (12), which are mutually superposed and insulated, and the color film base plate (20) comprises: a transparent base plate (21) oppositely arranged on one side, of the array base plate (10), provided with the planar electrode (11) and the slit-shaped electrode (12); and a color resistor (22) arranged on the transparent base plate (21) and corresponding to the slit-shaped electrode (12). The ratio of the light transmission rate T1 of anyone part of the color resistor (22) to the light transmission rate T2 of the other anyone part is equal to the ratio of the liquid crystal efficiency X2 of the slit-shaped electrode (12) corresponding to the other anyone part to the liquid crystal efficiency X1 corresponding to the anyone part. The light transmission rate of anyone position of the wide-viewing-angle liquid crystal display panel is high and uniform, bright and dark stripes are not generated, and the display effect is improved.

10 Claims, 3 Drawing Sheets

(56) References Cited

U.S. PATENT DOCUMENTS

| | | | |
|---|---|---|---|
| 2010/0066952 A1* | 3/2010 | Tsuchiya et al. | 349/106 |
| 2010/0182550 A1 | 7/2010 | Maezawa et al. | |
| 2014/0118668 A1 | 5/2014 | Xuan et al. | |

FOREIGN PATENT DOCUMENTS

| | | |
|---|---|---|
| CN | 101743504 A | 6/2010 |
| CN | 101995687 A | 3/2011 |
| CN | 102636922 A | 8/2012 |
| JP | 2003-202419 | 7/2003 |
| JP | 2008070688 A | 3/2008 |
| JP | 2010243624 A | 10/2010 |

OTHER PUBLICATIONS

English translation of Chinese Patent No. 1866059, 58pgs.
English translation of Chinese Patent No. 101743504, 33pgs.
English translation of Chinese Patent No. 101995687, 10pgs.
English translation of Chinese Patent No. 101206359, 15pgs.
English translation of Chinese Patent No. 102636922, 24pgs.
First Chinese Office Action issued by the Chinese Patent Office for Chinese Patent Application No. 2012100200742 dated Jan. 20, 2014, 6pgs.
English translation of First Chinese Office Action issued by the Chinese Patent Office for Chinese Patent Application No. 2012100200742 dated Jan. 20, 2014, 4pgs.
International Search Report for International Application No. PCT/CN2012/084851, 12pgs.
Jul. 24, 2015—(EP) European Search Report—App 12866358.0.

* cited by examiner

WIDE-VIEWING-ANGLE LIQUID CRYSTAL DISPLAY PANEL, COLOR FILM BASE PLATE AND MANUFACTURING METHOD THEREOF AS WELL AS DISPLAY DEVICE

CROSS REFERENCE TO RELATED APPLICATIONS

This application is based on International Application No. PCT/CN2012/084851 filed on Nov. 19, 2012, which claims priority to Chinese National Application No. 201210020074.2 filed on Jan. 21, 2012, the contents of which are incorporated herein by reference.

TECHNICAL FIELD

Embodiments of the present invention relate to a wide view angle liquid crystal display (LCD) panel, a color filter substrate, a manufacturing method thereof, and a display device.

BACKGROUND

Along with the development of the technology of LCD panels, LCD panels with narrow viewing angles have been gradually replaced by wide view angle LCD panels.

The traditional wide view angle LCD panels comprise fringe field switching (FFS) wide view angle LCD panels, vertical alignment (VA) wide view angle LCD panels, and in-plane switching (IPS) hard-screen wide view angle LCD panels. The common points among the three types of wide view angle LCD panels lie in that: an electric field between a common electrode and a pixel electrode on an array substrate is employed to drive liquid crystals to rotate, and the rotation degree of the liquid crystals is adjusted by the control of the magnitude of the electric field, and thus the wide view angle LCD panel can be achieved.

Taking the FFS wide view angle LCD panel for example, each sub-pixel comprises a common electrode and a pixel electrode arranged on an array substrate. When one electrode of the two electrodes is a planar electrode, the other electrode is a slit electrode. The slit electrode is arranged above the planar electrode and is opposite to a color filter substrate. Color filters on the color filter substrate are arranged according to the sub-pixels and correspond to the slit electrode of the corresponding sub-pixels on the array substrate.

Figure 1A:
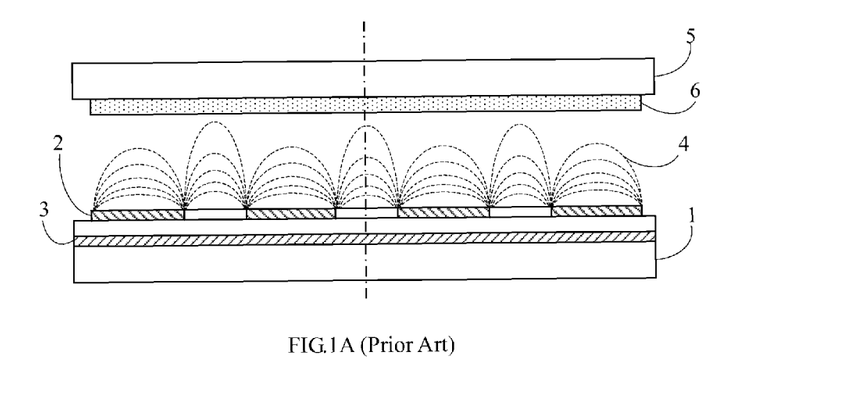
FIG. 1A is a partial schematic structural view of a traditional wide view angle LCD panel.
Figure 1B:
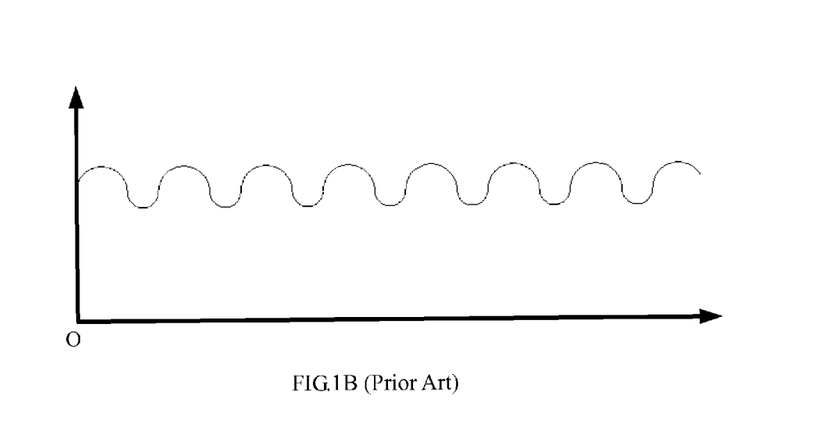
FIG. 1B is a schematic diagram illustrating the light transmittance of the wide view angle LCD panel in FIG. 1A.

As illustrated in FIG. 1A, during the operation of the FFS wide view angle LCD panel, an electric field is formed between a slit electrode 2 and a underlying planar electrode 3 on the array substrate 1 and drives the liquid crystals to rotate. In general, an electric field (as shown by equipotential lines 4 in FIG. 1A) between edges of a slit (the part on the slit electrode 2, without filled patterns, is a slit) and the planar electrode 3 is the strongest, and the rotation degree of the liquid crystals is the highest and the liquid crystal (LC) efficiency is the highest here. An electric field (as shown by the equipotential lines 4 in FIG. 1A) between a central section of the slit and the planar electrode 3 is the weakest, and the rotation degree of the liquid crystals is the lowest and the LC efficiency is the lowest here (as shown by an LC efficiency wavy curve in FIG. 1B). Because the LC efficiency is fluctuated on the entire plane, the array substrate 1 suffers the phenomenon of nonuniform light transmittance. That is to say, the light transmittance is high at the place with high LC efficiency and low at the place with low LC efficiency. On the other hand, as the light transmittance of a color filter 6 on the color filter substrate 5, corresponding to the slit electrode 2, is different at different places, the light transmittance of the FFS wide view angle LCD panel is finally varied along with the variation of the LC efficiency. Therefore, the light transmittance of the FFS wide view angle LCD panel suffers loss and become nonuniform accordingly, and thus pictures displayed by the FFS wide view angle LCD panel have bright and dark stripes, and consequently the display effect is poor.

It can be seen that the traditional wide view angle LCD panel has the disadvantages of nonuniform light transmittance and poor display effect.

SUMMARY

The embodiments of the present invention provide a wide view angle LCD panel, a color filter substrate, a manufacturing method thereof, and a display device, capable of solving the problems of nonuniform light transmittance and poor display effect in the traditional wide view angle LCD panels.

An embodiment of the present invention provides a wide view angle LCD panel, which comprises an array substrate and a color filter substrate, the array substrate comprises a planar electrode and a slit electrode, which are overlapped to and insulated with each other and configured to produce an electric field capable of driving liquid crystal molecules to rotate; the color filter substrate comprises a transparent substrate and a color filter, in which the transparent substrate is arranged opposite to one side of the array substrate, provided with the planar electrode and the slit electrode, and the color filter is arranged on the transparent substrate and corresponds to the slit electrode; and a ratio between light transmittance T1 of any one position on the color filter and light transmittance T2 of any other position on the color filter is equal to a ratio between LC efficiency X2 at a position, corresponding to the any other position, on the slit electrode and LC efficiency X1 at a position, corresponding to the any one position, on the slit electrode.

As for the wide view angle LCD panel, for instance, in the wide view angle LCD panel, the color filter is a first color filter with a same color depth at any position, and a ratio between a thickness H1 at any one position on the first color filter and a thickness H2 at any other position on the first color filter is equal to the ratio between the LC efficiency X1' at the position, corresponding to the any one position, on the slit electrode and the LC efficiency X2' at the position, corresponding to the any other position, on the slit electrode; or the color filter is a second color filter with a same thickness at any position, and a ratio between ink density N1 at any one position on the second color filter and the ink density N2 at any other position on the second color filter is equal to the LC efficiency X1" at the position, corresponding to the any one position, on the slit electrode and the LC efficiency X2" at the position, corresponding to the any other position, on the slit electrode.

As for the wide viewing LCD panel, for instance, in the array substrate, the planar electrode is a pixel electrode, and the slit electrode is a common electrode; or, the planar electrode is a common electrode, and the slit electrode is a pixel electrode.

An embodiment of the present invention provides a method for manufacturing a wide view angle LCD panel, comprising: manufacturing an array substrate comprising a planar electrode and a slit electrode, which are overlapped and insulated with each other and configured to produce an electric field capable of driving liquid crystal molecules to rotate; manufacturing a color filter substrate comprising a transparent substrate and a color filter arranged on the transparent substrate; and arranging the array substrate and the color filter substrate to be opposite to each other, in which one side of the array substrate, provided with the planar electrode and the slit electrode, is opposite to the color filter substrate; after the array substrate and the color filter substrate are arranged opposite to each other, the color filter corresponds to the slit electrode on the array substrate, and a ratio between light transmittance T1 of any one position on the color filter and light transmittance T2 of any other position on the color filter is equal to a ratio between LC efficiency X2 at a position, corresponding to the any other position, on the slit electrode and LC efficiency X1 at a position, corresponding to the any one position, on the slit electrode.

As for the manufacturing method, for instance, manufacturing of the color filter substrate comprises: forming a first color filter, with a same color depth at any position, on the transparent substrate, in which a ratio between a thickness H1 at any one position on the first color filter and a thickness H2 at any other position on the first color filter is equal to the ratio between the LC efficiency X1' at the position, corresponding to the any one position, on the slit electrode and the LC efficiency X2' at the position, corresponding to the any other position, on the slit electrode; or, forming a second color filter, with a same thickness at any position, on the transparent substrate, in which a ratio between ink density N1 at any one position on the second color filter and the ink density N2 at any other position on the second color filter is equal to the LC efficiency X1" at the position, corresponding to the any one position, on the slit electrode and the LC efficiency X2" at the position, corresponding to the any other position, on the slit electrode.

An embodiment of the present invention provides a color filter substrate, which is applied to a wide view angle LCD panel. The wide view angle LCD panel comprises an array substrate and the color filter substrate, the array substrate comprises a planar electrode and a slit electrode, which are overlapped to and insulated with each other and configured to produce an electric field capable of driving liquid crystal molecules to rotate, and the color filter substrate comprises a transparent substrate and a color filter arranged on the transparent substrate, in which after the array substrate and the color filter substrate are arranged opposite to each other, the color filter corresponds to the slit electrode on the array substrate, and a ratio between light transmittance T1 of any one position on the color filter and light transmittance T2 of any other position on the color filter is equal to a ratio between LC efficiency X2 at a position, corresponding to the any other position, on the slit electrode and LC efficiency X1 at a position, corresponding to the any one position, on the slit electrode.

An embodiment of the present invention provides a method for manufacturing a color filter substrate, wherein the color filter substrate is applied to a wide view angle LCD panel. The wide view angle LCD panel comprises an array substrate comprising a planar electrode and a slit electrode, which are overlapped to and insulated with each other and configured to produce an electric field capable of driving liquid crystal molecules to rotate. The manufacturing method comprises: forming a color filter on a transparent substrate, in which after the array substrate and the color filter substrate are arranged opposite to each other, the color filter corresponds to the slit electrode on the array substrate, and a ratio between light transmittance T1 of any one position on the color filter and light transmittance T2 of any other position on the color filter is equal to a ratio between LC efficiency X2 at a position, corresponding to the any other position, on the slit electrode and LC efficiency X1 at a position, corresponding to the any one position, on the slit electrode.

An embodiment of the present invention further provides a display device employing the foregoing wide view angle LCD panel.

In the technical solutions provided by the embodiments of the present invention, the light transmittance at any one position on the color filter of the color filter substrate is in a compensation relationship with the LC efficiency at a position, corresponding to the any one position, on the slit electrode. When the LC efficiency at the position, corresponding to the any one position, on the slit electrode is large, the light transmittance at the any one position on the color filter is small; and when the LC efficiency at the position, corresponding to the any one position, on the slit electrode is small, the light transmittance at the any one position on the color filter is large. The final compensation effect is that the light transmittance at any position of the wide view angle LCD panel is made high and uniform. Compared with the traditional wide view angle LCD panel, the phenomenon of bright and dark stripes will not occur, and thus the display effect can be improved. The display device provided by the embodiment of the present invention has the foregoing effect due to the adoption of the foregoing wide view angle LCD panel.

BRIEF DESCRIPTION OF THE DRAWINGS

Simple description will be given below to the accompanying drawings of the embodiments to provide a more clear understanding of the technical solutions of the embodiments of the present invention. It will be obvious to those skilled in the art that the drawings described below only involve some embodiments of the present invention but are not intended to limit the present invention.

DETAILED DESCRIPTION

For more clear understanding of the objectives, technical solutions and advantages of the embodiments of the present invention, clear and complete description will be given below to the technical solutions of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise specified, the technical or scientific terms used herein should have normal meanings understood by those skilled in the art. The words "first", "second" and the like used in the description and the claims of the patent application of the present invention do not indicate the sequence, the number or the importance but are only used for distinguishing different components. Similarly, the terms "a", "an" and the like also do not indicate the number but only indicate at least one. The terms "comprise", "include" and the like indicates that an element or an object before the word "comprise" or "include" contains elements, objects or equivalents thereof illustrated after the word "comprise" or "include", without excluding other elements or objects. The words "connection", "connected" and the like are not limited to physical or mechanical connection but may comprise electrical connection, either directly or indirectly. The words "on", "under", "left", "right" and the like only indicate the relative position relationship which may be correspondingly changed when the absolute position of a described object is changed.

Figure 2A:
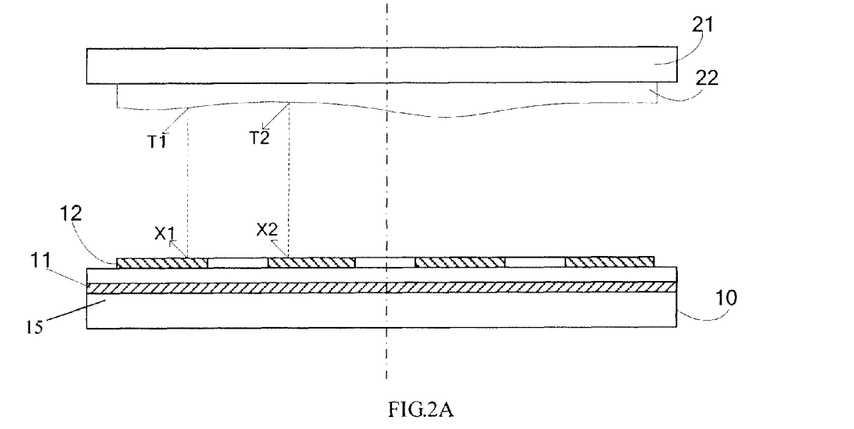
FIG. 2A is a partial schematic structural view of a wide view angle LCD panel in an embodiment of the present invention.

As illustrated in FIG. 2A, the wide view angle LCD panel provided by the embodiment of the present invention comprises an array substrate 10 and a color filter substrate 20; the array substrate 10 comprises a transparent substrate 15, and a planar electrode 11 and a slit electrode 12, which are formed on the transparent substrate 15 and overlapped to and insulated with each other. The planar electrode 11 and the slit electrode 12 as shown in FIG. 2A, for instance, belong to one sub-pixel and are configured to produce an electric field capable of driving liquid crystal molecules above the electrodes.

The color filter substrate 20 comprises a transparent substrate 21 and a color filter 22; the transparent substrate 21 is arranged opposite to one side of the array substrate 10, provided with the planar electrode 11 and the slit electrode 12; the color filter 22 is arranged on the transparent substrate 21 and corresponds to the slit electrode 12; and the color filter 22, for instance, also belongs to one sub-pixel, and for instance, is a red, green or blue color filter. Color filters are, for instance, separated from each other through black matrixes (not shown).

The ratio (T1/T2) between the light transmittance T1 at any one position on the color filter 22 and the light transmittance T2 at any other position on the color filter 22 is equal to the ratio (X2/X1) between the LC efficiency X2 at a position, corresponding to the any other position, on the slit electrode 12 and the LC efficiency X1 at a position, corresponding to the any one position, on the slit electrode 12.

Figure 2B:
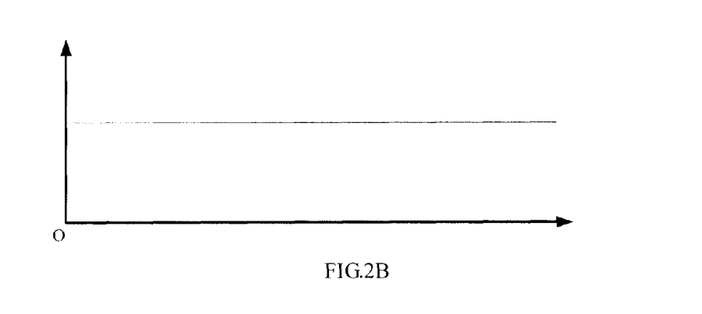
FIG. 2B is a schematic diagram illustrating the light transmittance of the wide view angle LCD panel in FIG. 2A.

In the wide view angle LCD panel provided by the embodiment of the present invention, the light transmittance at any one position on the color filter of the color filter substrate is in compensation relationship with the LC efficiency at a position, corresponding to the any one position, on the slit electrode. That is to say, when the LC efficiency at the position, corresponding to the any one position, on the slit electrode is large, the light transmittance at the any one position on the color filter is small; and when the LC efficiency at the position, corresponding to the any one position, on the slit electrode is small, the light transmittance at the any one position on the color filter is large. The final compensation effect is that the light transmittance at any position of the wide view angle LCD panel is made high and uniform (as shown in FIG. 2B). Compared with the traditional wide view angle LCD panel, the phenomenon of bright and dark stripes will not occur, and thus the display effect can be improved.

For instance, preferably, the color filter may also be either color filter of the following two kinds of the color filters.

First Color Filter

Figure 3A:
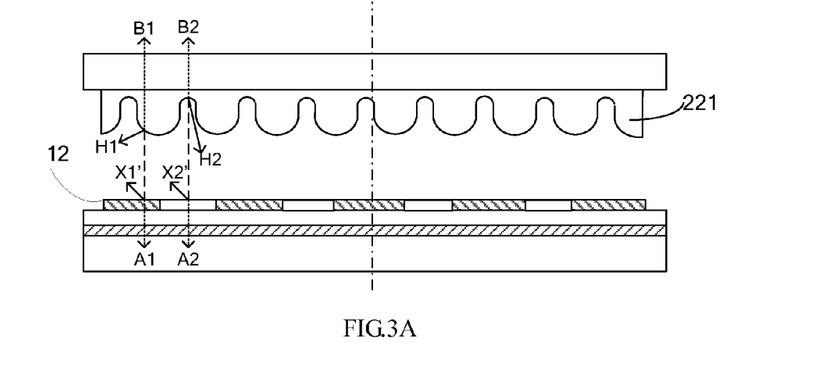
FIG. 3A is a partial schematic structural view of another wide view angle LCD panel in an embodiment of the present invention.

As shown in FIG. 3A, the color filter may be specifically a first color filter with the same color depth at any position, namely the color depth of the first color filter 221 is the same on the entire plane. In addition, the ratio (H1/H2) between the thickness H1 at any one position on the first color filter 221 and the thickness H2 at any other position on the first color filter 221 is equal to the ratio (X1'/X2') between the LC efficiency X1' at a position, corresponding to the any one position, on the slit electrode and the LC efficiency X2' at a position, corresponding to the any other position, on the slit electrode, namely H1/H2=X1'/X2'.

The first color filter may be generally produced by a mask process. The light transmittance of the first color filter is controlled by the thickness.

Second Color Filter

Figure 3B:
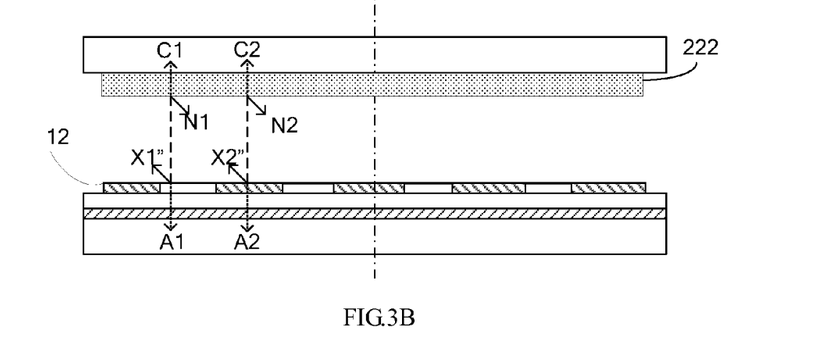
FIG. 3B is a partial schematic structural view of a still another wide view angle LCD panel in an embodiment of the present invention.

As shown in FIG. 3B, the color filter may also be specifically a second color filter 222 with the same thickness at any position. The ratio (N1/N2) between the ink density N1 at any one position on the second color filter 222 and the ink density N2 at any other position on the second color filter is equal to the ratio (X1''/X2'') between the LC efficiency X1'' at a position, corresponding to the any one position, on the slit electrode 12 and the LC efficiency X2'' at a position, corresponding to the any other position, on the slit electrode 12, namely N1/N2=X1''/X2''.

The second color filter may be produced by an inkjet process or a print process. The light transmittance of the second color filter is controlled by the ink density.

In the embodiment, in the array substrate, the planar electrode is a pixel electrode, and the slit electrode is a common electrode; or, the planar electrode is a common electrode, and the slit electrode is a pixel electrode. The pixel electrode is connected with a switching element (e.g., a TFT) of a corresponding sub-pixel and applied with a data voltage; and the common electrode is connected with a common electrode wire and applied with a common voltage.

The array substrate and/or a transparent substrate of the color filter substrate may be a glass substrate, a quartz substrate, a plastic substrate or the like.

Moreover, an embodiment of the present invention further provides a method for manufacturing a wide view angle LCD panel, which comprises the following steps:

step S41: manufacturing an array substrate having a planar electrode and a slit electrode, which are overlapped to and insulated with each other and configured to produce an electric field capable of driving liquid crystal molecules to rotate;

step S42: manufacturing a color filter substrate comprising a transparent substrate and a color filter arranged on the transparent substrate, in which after the array substrate and the color filter substrate are arranged opposite to each other, the color filter corresponds to the slit electrode on the array substrate, and the ratio between the light transmittance T1 at any one position on the color filter and the light transmittance T2 at any other position on the color filter can be equal to the ratio between the LC efficiency X2 at a position, corresponding to the any other position, on the slit electrode and the LC efficiency X1 at a position, corresponding to the any one position, on the slit electrode; and step S43: arranging the array substrate and the color filter substrate to be opposite to each other, in which one side of the array substrate, provided with the planar electrode and the slit electrode, is opposite to the color filter substrate.

The array substrate and the color filter substrate which are arranged opposite to each other form a liquid crystal cell through a sealant; liquid crystal materials are filled between the array substrate and the color filter substrate; and the liquid crystal cell is sealed to obtain a liquid crystal panel.

In the wide view angle LCD panel manufactured by the foregoing manufacturing method provided by the embodiment of the present invention, the light transmittance at any one position on the color filter of the color filter substrate is in compensation relationship with the LC efficiency at a position, corresponding to the any one position, on the slit electrode. That is to say, when the LC efficiency at the position, corresponding to the any one position, on the slit electrode is large, the light transmittance at the any one position on the color filter is small; and when the LC efficiency at the position, corresponding to the any one position, on the slit electrode is small, the light transmittance at the any one position on the color filter is large. The final compensation effect is that the light transmittance at any position of the wide view angle LCD panel is made high and uniform. Compared with the traditional wide view angle LCD panel, the phenomenon of bright and dark stripes will not occur, and thus the display effect can be improved.

For instance, preferably, the step S42 may be specifically implemented in either mode of the following two modes.

First Mode

A first color filter with the same color depth at any position is formed on the transparent substrate. The ratio between the thickness H1 at any one position on the first color filter and the thickness H2 at any other position on the first color filter is equal to the ratio between the LC efficiency X1' at a position, corresponding to the any one position, on the slit electrode and the LC efficiency X2' at a position, corresponding to the any other position, on the slit electrode (as shown in FIG. 3A).

The first mode can be implemented by a mask process or a semi-transparent mask process. The thickness at any position on the first color filter is inversely proportional to the light transmittance at the position. The light transmittance is controlled by the thickness.

Given that the LC efficiency at a position A1 on the slit electrode is 100 percent and the LC efficiency at a position A2 on the slit electrode is 80 percent, the ratio between the LC efficiency at the position A1 on the slit electrode and the LC efficiency at the position A2 on the slit electrode is 1:0.8, and hence the ratio between the light transmittance at a position B1 (corresponding to the position A1) on the first color filter and the light transmittance at a position B2 (corresponding to the position A2) on the first color filter is 0.8:1; and in view of the thickness, the ratio between the thickness at the position B1 and the thickness at the position B2 should be made 1:0.8. When the semi-transparent mask process is adopted, the ratio between the exposure amount at the position B1 and the exposure amount at the position B2 can be set to be 1:0.8. Therefore, after the exposure process and the subsequent processes such as development and baking, the ratio between the light transmittance at the position B1 on the first color filter and the light transmittance at the position B2 on the first color filter is 0.8:1 and is equal to the ratio between the LC efficiency at the position A2 on the slit electrode and the LC efficiency at the position A1 on the slit electrode.

Second Mode

A second color filter with the same thickness at any position is formed on the transparent substrate. The ratio between the ink density N1 at any one position on the second color filter and the ink density N2 at any other position on the second color filter is equal to the ratio between the LC efficiency X1" at a position, corresponding to the any one position, on the slit electrode and the LC efficiency X2" at a position, corresponding to the any other position, on the slit electrode (as shown in FIG. 3B).

The second mode may be implemented by an inkjet process or a print process. The color depth at any position on the second color filter is inversely proportional to the light transmittance. The light transmittance is controlled by the color depth.

Given that the LC efficiency at a position A1 on the slit electrode is 100 percent and the LC efficiency at a position A2 on the slit electrode is 80 percent, the ratio between the LC efficiency at the position A1 on the slit electrode and the LC efficiency at the position A2 on the slit electrode is 1:0.8, and hence the ratio between the light transmittance at a position C1 (corresponding to the position A1) on the first color filter and the light transmittance at a position C2 (corresponding to the position A2) on the second color filter is 0.8:1; and in view of the color depth, the ratio between the color depth at the position C1 and the color depth at the position C2 should be made 1:0.8. When the inkjet process is adopted, the ratio between the ink density at the position C1 and the ink density at the position C2 can be set to be 1:0.8. Therefore, the ratio between the light transmittance at the position C1 on the second color filter and the light transmittance at the position C2 on the second color filter is 0.8:1 and is equal to the ratio between the LC efficiency at the position A2 on the slit electrode and the LC efficiency at the position A1 on the slit electrode.

Moreover, an embodiment of the present invention further provides a color filter substrate, which is applied to a wide view angle LCD panel. The wide view angle LCD panel comprises an array substrate, the array substrate comprises a planar electrode and a slit electrode, which are overlapped to and insulated with each other and configured to produce an electric field capable of driving liquid crystal molecules to rotate. The color filter substrate comprises a transparent substrate and a color filter arranged on the transparent substrate. After the array substrate and the color filter substrate are arranged opposite to each other, the color filter corresponds to the slit electrode on the array substrate, and the ratio between the light transmittance T1 at any one position on the color filter and the light transmittance T2 at any other position on the color filter is equal to the ratio between the LC efficiency X2 at a position, corresponding to the any other position, on the slit electrode and the LC efficiency X1 at a position, corresponding to the any one position, on the slit electrode (as for the specific structure, see the part of the color filter substrate in FIG. 2A).

The color filter substrate provided by the embodiment of the present invention can be applied to the foregoing appropriate wide view angle LCD panel. The light transmittance at any one position on the color filter of the color filter substrate is in compensation relationship with the LC efficiency at a position, corresponding to the any one position, on the slit electrode. That is to say, when the LC efficiency at the position, corresponding to the any one position, on the slit electrode is large, the light transmittance at the any one position on the color filter is small; and when the LC efficiency at the position, corresponding to the any one position, on the slit electrode is small, the light transmittance at the any one position on the color filter is large. The final compensation effect is that the light transmittance at any position of the wide view angle LCD panel is made high and uniform. Compared with the traditional wide view angle LCD panel, the phenomenon of bright and dark stripes will not occur, and thus the display effect can be improved.

For instance, the color filter may also be divided into a first color filter and a second color filter. For the relevant details, see the forgoing relevant recitations of the first color filter and the second color filter, which will not be further repeated herein.

Moreover, the embodiment of the present invention further provides a method for manufacturing the aforesaid color filter substrate, and the color filter substrate is applied to a wide view angle LCD panel. The wide view angle LCD panel comprises an array substrate comprising a planar electrode and a slit electrode, which are overlapped to and insulated with each other and configured to produce an electric field capable of driving liquid crystal molecules to rotate.

The manufacturing method comprises: forming a color filter on a transparent substrate, in which after the array substrate and the color filter substrate are arranged opposite to each other, the color filter corresponds to the slit electrode on the array substrate, and the ratio between the light transmittance T1 at any one position on the color filter and the light transmittance T2 at any other position on the color filter can be equal to the ratio between the LC efficiency X2 at a position, corresponding to the any other position, on the slit electrode and the LC efficiency X1 at a position, corresponding to the any one position, on the slit electrode.

The color filter substrate manufactured by the manufacturing method provided by the embodiment of the present invention can be applied to the foregoing appropriate wide view angle LCD panel. The light transmittance at any one position on the color filter of the color filter substrate is in compensation relationship with the LC efficiency at a position, corresponding to the any one position, on the slit electrode. That is to say, when the LC efficiency at the position, corresponding to the any one position, on the slit electrode is large, the light transmittance at the any one position on the color filter is small; and when the LC efficiency at the position, corresponding to the any one position, on the slit electrode is small, the light transmittance at the any one position on the color filter is large. The final compensation effect is that the light transmittance at any position of the wide view angle LCD panel is made high and uniform. Compared with the traditional wide view angle LCD panel, the phenomenon of bright and dark stripes will not occur, and thus the display effect can be improved.

For instance, preferably, the step of "forming the color filter on the transparent substrate" may also be implemented in the aforesaid specific implementation mode (the first mode and the second mode) the same with the step S42. For the details, please see the relevant recitations of the first mode and the second mode, which will not be further repeated herein.

It should be noted that the method for manufacturing the color filter substrate may further comprise the step of forming a black matrix on the transparent substrate in all the steps of the method for manufacturing the color filter substrate in the embodiment of the present invention. For the details of the method for forming the black matrix, please refer to the art of state, which will not be further repeated herein.

Moreover, in the embodiments of the present invention, a planar electrode refers to an electrode which is in a planar shape, and a slit electrode refers to a planar electrode in which slits are formed; a plurality of the slit electrode are formed on one array substrate; the color filters are arranged according to the sub-pixels, and the light of a certain color can pass through the color filter; a plurality of the color filters are arranged on one color filter substrate and correspond to the slit electrodes one by one; and a liquid crystal layer can be disposed between the array substrate and the color filter substrate in the embodiment of the present invention.

The embodiment of the present invention provides a display device employing the foregoing wide view angle LCD panel. The display device may be a mobile phone, a notebook computer, a television, a tablet, a navigator or any device having the display function.

The foregoing is only the preferred embodiments of the present invention. It should be noted that various modifications and improvements can be also made by those skilled in the art without departing from the principles of the present invention and should also fall within the scope of protection of the present invention.

The invention claimed is:

1. A color filter substrate, applied to a wide view angle LCD panel comprising an array substrate and the color filter substrate, wherein the array substrate comprising a planar electrode and a slit electrode, which are overlapped and insulated with each other and configured to produce an electric field capable of driving liquid crystal molecules to rotate; and the color filter substrate comprising:
    a transparent substrate; and
    a color filter arranged on the transparent substrate;
    wherein after the array substrate and the color filter substrate are arranged opposite to each other, the color filter corresponds to the slit electrode on the array substrate, and a ratio between light transmittance T1 of any one position on the color filter and light transmittance T2 of any other position on the color filter is equal to a ratio between LC efficiency X2 at a position, corresponding to the any other position, on the slit electrode and LC efficiency X1 at a position, corresponding to the any one position, on the slit electrode.

2. The color filter substrate according to claim 1, wherein the color filter is a first color filter with a same color depth at any position, and a ratio between a thickness H1 at any one position on the first color filter and a thickness H2 at any other position on the first color filter is equal to the ratio between the LC efficiency X1 at the position, corresponding to the any one position, on the slit electrode and the LC efficiency X2 at the position, corresponding to the any other position, on the slit electrode; or,
    the color filter is a second color filter with a same thickness at any position, and a ratio between ink density N1 at any one position on the second color filter and the ink density N2 at any other position on the second color filter is equal to the LC efficiency X1 at the position, corresponding to the any one position, on the slit electrode and the LC efficiency X2 at the position, corresponding to the any other position, on the slit electrode.

3. A wide view angle liquid crystal display (LCD) panel, comprising:
    an array substrate comprising a planar electrode and a slit electrode, which are overlapped and insulated with each other and configured to produce an electric field capable of driving liquid crystal molecules to rotate; and
    a color filter substrate comprising:
    a transparent substrate arranged opposite to one side of the array substrate provided with the planar electrode and the slit electrode; and
    a color filter arranged on the transparent substrate and corresponding to the slit electrode,
    wherein a ratio between light transmittance T1 of any one position on the color filter and light transmittance T2 of any other position on the color filter is equal to a ratio between LC efficiency X2 at a position, corresponding to the any other position, on the slit electrode and LC efficiency X1 at a position, corresponding to the any one position, on the slit electrode.

4. The wide view angle LCD panel according to claim 3, wherein the color filter is a first color filter with a same color depth at any position, and a ratio between a thickness H1 at any one position on the first color filter and a thickness H2 at any other position on the first color filter is equal to the ratio between the LC efficiency X1 at the position, corresponding to the any one position, on the slit electrode and the LC efficiency X2 at the position, corresponding to the any other position, on the slit electrode; or the color filter is a second color filter with a same thickness at any position, and a ratio between ink density N1 at any one position on the second color filter and the ink density N2 at any other position on the second color filter is equal to the LC efficiency X1 at the position, corresponding to the any one position, on the slit electrode and the LC efficiency X2 at the position, corresponding to the any other position, on the slit electrode.

5. The wide view angle LCD panel according to claim 3, wherein in the array substrate, the planar electrode is a pixel electrode, and the slit electrode is a common electrode; or, the planar electrode is a common electrode, and the slit electrode is a pixel electrode.

6. The wide view angle LCD panel according to claim 4, wherein in the array substrate, the planar electrode is a pixel electrode, and the slit electrode is a common electrode; or, the planar electrode is a common electrode, and the slit electrode is a pixel electrode.

7. A display device comprising the wide view angle LCD panel according to claim 3.

8. The display device according to claim 7, wherein the color filter is a first color filter with a same color depth at any position, and a ratio between a thickness H1 at any one position on the first color filter and a thickness H2 at any other position on the first color filter is equal to the ratio between the LC efficiency X1 at the position, corresponding to the any one position, on the slit electrode and the LC efficiency X2 at the position, corresponding to the any other position, on the slit electrode; or the color filter is a second color filter with a same thickness at any position, and a ratio between ink density N1 at any one position on the second color filter and the ink density N2 at any other position on the second color filter is equal to the LC efficiency X1 at the position, corresponding to the any one position, on the slit electrode and the LC efficiency X2 at the position, corresponding to the any other position, on the slit electrode.

9. A method for manufacturing a wide view angle LCD panel, comprising:

manufacturing an array substrate comprising a planar electrode and a slit electrode, which are overlapped and insulated with each other and configured to produce an electric field capable of driving liquid crystal molecules to rotate;

manufacturing a color filter substrate comprising a transparent substrate and a color filter arranged on the transparent substrate; and arranging the array substrate and the color filter substrate to be opposite to each other, in which one side of the array substrate, provided with the planar electrode and the slit electrode, is opposite to the color filter substrate;

wherein after the array substrate and the color filter substrate are arranged opposite to each other, the color filter corresponds to the slit electrode on the array substrate, and a ratio between light transmittance T1 of any one position on the color filter and light transmittance T2 of any other position on the color filter is equal to a ratio between LC efficiency X2 at a position, corresponding to the any other position, on the slit electrode and LC efficiency X1 at a position, corresponding to the any one position, on the slit electrode.

10. The manufacturing method according to claim 9, wherein manufacturing of the color filter substrate comprises:

forming a first color filter, with a same color depth at any position, on the transparent substrate, in which a ratio between a thickness H1 at any one position on the first color filter and a thickness H2 at any other position on the first color filter is equal to the ratio between the LC efficiency X1 at the position, corresponding to the any one position, on the slit electrode and the LC efficiency X2 at the position, corresponding to the any other position, on the slit electrode; or, forming a second color filter, with a same thickness at any position, on the transparent substrate, in which a ratio between ink density N1 at any one position on the second color filter and the ink density N2 at any other position on the second color filter is equal to the LC efficiency X1 at the position, corresponding to the any one position, on the slit electrode and the LC efficiency X2 at the position, corresponding to the any other position, on the slit electrode.

* * * * *